United States Patent
Mukherjee (10) Patent No.: US 11,379,372 B1
(45) Date of Patent: Jul. 5, 2022

(54) MANAGING PREFETCH LOOKAHEAD DISTANCE BASED ON MEMORY ACCESS LATENCY

(71) Applicant: Marvell Asia Pte, Ltd., Singapore (SG)

(72) Inventor: Shubhendu Sekhar Mukherjee, Southborough, MA (US)

(73) Assignee: Marvell Asia Pte, Ltd., Singapore (SG)

( * ) Notice: Subject to any disclaimer, the term of this patent is extended or adjusted under 35 U.S.C. 154(b) by 8 days.

(21) Appl. No.: 16/863,290

(22) Filed: Apr. 30, 2020

Related U.S. Application Data (60) Provisional application No. 62/876,468, filed on Jul. 19, 2019.

(51) Int. Cl.
| | |
|---|---|
| *G06F 12/0862* | (2016.01) |
| *G06F 12/0811* | (2016.01) |
| *G06F 12/02* | (2006.01) |
| *G06F 9/30* | (2018.01) |
| *G06F 13/16* | (2006.01) |

(52) U.S. Cl.
CPC ...... *G06F 12/0862* (2013.01); *G06F 9/30047* (2013.01); *G06F 12/0215* (2013.01); *G06F 12/0811* (2013.01); *G06F 13/1631* (2013.01)

(58) Field of Classification Search
CPC ............. G06F 12/0862; G06F 12/0215; G06F 12/0811
See application file for complete search history.

(56) References Cited

U.S. PATENT DOCUMENTS

| | | |
|---|---|---|
| 5,721,864 A | 2/1998 | Chiarot et al. |
| 7,627,742 B2 | 12/2009 | Bose et al. |
| 8,443,151 B2 | 5/2013 | Tang et al. |
| 8,856,452 B2 | 10/2014 | Sun et al. |
| 10,599,577 B2 | 3/2020 | Mukherjee et al. |
| 2004/0117557 A1* | 6/2004 | Paulraj .................. G06F 9/3455 711/137 |

(Continued)

OTHER PUBLICATIONS

P. Michaud, "Best-offset hardware prefetching," 2016 IEEE International Symposium on High Performance Computer Architecture (HPCA), 2016, pp. 469-480, doi: 10.1109/HPCA.2016.7446087.*

(Continued)

*Primary Examiner* — Tracy A Warren
(74) *Attorney, Agent, or Firm* — Young Basile Hanlon & MacFarlane, P.C.

(57) ABSTRACT

Memory prefetching in a processor comprises: identifying, in response to memory access instructions, a pattern of addresses; in response to a first memory access request corresponding to a sub-pattern of the pattern of addresses, prefetching a first address that is offset from the sub-pattern of addresses by a first lookahead value, wherein the first address is part of the pattern; measuring a memory access latency; determining, based on the memory access latency, a second lookahead value, wherein the second lookahead value is different from the first lookahead value; and in response to a second memory access request corresponding to the sub-pattern of the pattern of addresses, prefetching a second address, wherein the second address is part of the pattern, and wherein the second address is offset from the sub-pattern of addresses by the second lookahead value.

21 Claims, 6 Drawing Sheets

(56) References Cited

U.S. PATENT DOCUMENTS

| | | | |
|---|---|---|---|
| 2007/0094453 A1* | 4/2007 | Santhanakrishnan | ................... G06F 12/0862 711/137 |
| 2009/0199190 A1 | 8/2009 | Chen et al. | |
| 2012/0084511 A1* | 4/2012 | Dooley | .............. G06F 9/383 711/122 |
| 2014/0108740 A1 | 4/2014 | Rafacz et al. | |
| 2014/0149668 A1* | 5/2014 | Chaudhary | ......... G06F 12/0862 711/119 |
| 2014/0359221 A1* | 12/2014 | Kalamatianos | ..... G06F 12/0811 711/122 |
| 2015/0143057 A1* | 5/2015 | Pavlou | ............... G06F 12/02 711/137 |
| 2016/0054997 A1* | 2/2016 | Radhakrishnan | ..... G06F 9/3455 711/137 |
| 2017/0322885 A1* | 11/2017 | Mukherjee | .......... G06F 12/0897 |
| 2019/0205135 A1* | 7/2019 | Nori | .................... G06F 9/3814 |
| 2019/0272234 A1* | 9/2019 | Bondarenko | ....... G06F 12/0862 |
| 2020/0125493 A1* | 4/2020 | Bent | ................... G06F 12/0862 |
| 2020/0167286 A1* | 5/2020 | Carlson | .............. G06F 12/1009 |

OTHER PUBLICATIONS

Jain, A. and Lin, C., "Linearizing irregular memory accesses for improved correlated prefetching", MICRO 46: Proceedings of the 46th Annual IEEE/ACM International Symposium on Microarchitecture (p. 247-259), Dec. 2013.

W. Heirman et al., "Near-Side Prefetch Throttling: Adaptive Prefetching for High-Performance Many-Core Processors," PACT '18, Nov. 1-4, 2018, Limassol, Cyprus.

* cited by examiner

MANAGING PREFETCH LOOKAHEAD DISTANCE BASED ON MEMORY ACCESS LATENCY

CROSS-REFERENCE TO RELATED APPLICATION(S)

This application claims priority to and the benefit of U.S. Provisional Application Patent Ser. No. 62/876,468, filed Jul. 19, 2019, the entire disclosure of which is hereby incorporated by reference.

TECHNICAL FIELD

This disclosure relates generally to processors and more specifically to managing prefetch lookahead distance based on memory access latency.

BACKGROUND

In a demand-fetch model, the content (e.g., a datum) of a memory location are fetched in response to an instruction request (e.g., a memory load instruction). If the requested datum is not in a cache, the datum is fetched from main memory. As memory access latency is relatively long (e.g., in terms of processor cycles), the processor may stall (e.g., sit idly) until the datum is fetched.

Prefetching can be employed as a latency tolerance technique. Generally, a prefetch request is a type of memory request that attempts to predict a future memory request based on a predicted or learned access pattern (i.e., an accessed pattern of addresses). That is, memory content (e.g., program instructions or data) is fetched and loaded into a memory system (e.g., a cache) before it is needed. The prefetch request can be used to preload a memory level (e.g., a cache level in a hierarchical memory system, or other storage location, which has a relatively faster access time than another memory level, such as main memory) so that the expected future memory request will hit in that cache level instead of having to access a higher cache level or a main memory. Thus, prefetching attempts to mitigate (e.g., eliminate or, at least, reduce) the memory access latency and/or cache misses thereby increasing the processor throughput.

At a high level, a prefetcher works as follows: the prefetcher detects a pattern of memory accesses; when the prefetcher detects that a part of the pattern is being accessed, then the prefetcher prefetches a next address that is part of the pattern. The next address is at a lookahead distance from the part of the pattern is being accessed. To restate, a prefetcher observes memory accesses (e.g., loads and stores) and prefetches data based on past access behavior.

SUMMARY

In one aspect, in general, a method for memory prefetching in a processor, comprises: identifying, in response to memory access instructions, a pattern of addresses; in response to a first memory access request corresponding to a sub-pattern of the pattern of addresses, prefetching a first address that is offset from the sub-pattern of addresses by a first lookahead value, wherein the first address is part of the pattern; measuring a memory access latency; determining, based on the memory access latency, a second lookahead value, wherein the second lookahead value is different from the first lookahead value; and in response to a second memory access request corresponding to the sub-pattern of the pattern of addresses, prefetching a second address, wherein the second address is part of the pattern, and wherein the second address is offset from the sub-pattern of addresses by the second lookahead value.

In another aspect, in general, a processor comprises: a first memory level; a second memory level; and a prefetcher, wherein the prefetcher is configured to monitor memory accesses in the first memory level, wherein the prefetcher is further configured to prefetch from the first memory level to the second memory level, and wherein the prefetcher is further configured to: identify, in response to memory access instructions, a pattern of addresses; in response to a first memory access request corresponding to a sub-pattern of the pattern of addresses, prefetching, from the first memory level to the second memory level, a first address that is offset from the sub-pattern of addresses by a first lookahead value, wherein the first address is part of the pattern; measure a memory access latency of the first memory level; determine, based on the memory access latency, a second lookahead value, wherein the second lookahead value is different from the first lookahead value; and in response to a second memory access request corresponding to the sub-pattern of the pattern of addresses, prefetch a second address, wherein the second address is part of the pattern, and wherein the second address is offset from the sub-pattern of addresses by the second lookahead value.

In another aspect, in general, an apparatus comprises: memory; a cache; and a prefetcher, wherein the prefetcher is configured to monitor memory accesses in the memory, wherein the prefetcher is further configured to prefetch from the memory to the cache, and wherein the prefetcher is further configured to: identify, in response to memory access instructions, a pattern of addresses; in response to a first memory access request corresponding to a sub-pattern of the pattern of addresses, prefetching, from the memory to the cache, a first address that is offset from the sub-pattern of addresses by a first lookahead value, wherein the first address is part of the pattern; measure a memory access latency of the memory; determine, based on the memory access latency, a second lookahead value, wherein the second lookahead value is different from the first lookahead value; and in response to a second memory access request corresponding to the sub-pattern of the pattern of addresses, prefetch a second address, wherein the second address is part of the pattern, and wherein the second address is offset from the sub-pattern of addresses by the second lookahead value.

Aspects can include one or more of the following features.

The first memory level comprises a main memory, and the second memory level comprises a cache level of a hierarchical memory system.

The first memory level comprises a non-deterministic memory level such that a first access to the first memory has a latency of a first number of processor cycles, and a second access to the first memory level has a latency of a second number of processor cycles, wherein the first number of processor cycles is different from the second number of processor cycles.

The prefetcher is further configured to set the second lookahead value based on a comparison of the memory access latency to a function of a nominal latency of a memory level accessed by the memory access instructions.

The comparison compares the memory access latency to a multiple of the nominal latency of the memory level.

Determining, based on the memory access latency, the second lookahead value comprises: in response to determining that the memory access latency exceeds the function of the nominal latency, setting the second lookahead value to be further away from the sub-pattern of the pattern of addresses than the first lookahead value.

Determining, based on the memory access latency, the second lookahead value comprises: in response to determining that the memory access latency does not exceed the function of the nominal latency, setting the second lookahead value to be closer to the sub-pattern of the pattern of addresses than the first lookahead value.

The pattern of addresses is a stream pattern comprising a stride, the first lookahead value is a first multiple of the stride, and the second lookahead value is a second multiple of the stride that is different from the first multiple of the stride.

The pattern of addresses pattern comprises a correlated pattern of addresses, the first lookahead value corresponds to an offset, relative to the sub-pattern, of the first address of the correlated addresses pattern, and the second lookahead value corresponds to an offset, relative to the sub-pattern, of the second address of the correlated addresses pattern that is different from the first address of the correlated addresses pattern.

Aspects can have one or more of the following advantages.

As memory access latency can be non-deterministic (i.e., variable), techniques that adjust the lookahead distance (e.g., lookahead value, or simply, lookahead) based on the actual memory access latency are useful. The non-deterministic memory access latency may be caused, for example, by contention for a shared resource, such as a shared last level cache or a shared interconnection network connecting main memory to different processor cores.

These and other aspects of this disclosure are disclosed in the following detailed description of the implementations, the appended claims and the accompanying figures.

BRIEF DESCRIPTION OF THE DRAWINGS

The disclosure is best understood from the following detailed description when read in conjunction with the accompanying drawings, wherein like reference numerals refer to like parts throughout the several views. It is emphasized that, according to common practice, the various features of the drawings are not to-scale. On the contrary, the dimensions of the various features are arbitrarily expanded or reduced for clarity.

DETAILED DESCRIPTION

As mentioned above, prefetching can be used as a memory access latency mitigation technique. Prefetching can be performed using various modules that are implemented in hardware. For example, a prefetcher can be part of a computing system, such as the computing system 100 of FIG. 1.

One or more prefetching strategies (managed using one or more prefetchers) can be employed in a computing system. Examples of prefetchers include a stream (or strided) prefetcher and a correlated prefetcher. Other prefetching strategies are possible. At a high level, a prefetcher learns a pattern of memory address accesses and uses the pattern to perform prefetches.

The stream prefetcher learns a pattern of addresses in the form of a stream. A stream (which may also be called a 'strided stream') occurs when there is a sequence of multiple requests for values, where the address offset between adjacent values in the stream (called the 'stride') is fixed (e.g., measured in cache lines or 'cache blocks').

The stream prefetcher can detect that subsequent accesses to memory are offset from an immediately preceding accessed memory location by the stride value. For example, the stream prefetcher can detect (i.e., learn, etc.) the pattern of memory accesses X (i.e., X+0*350), X+350 (i.e., X+1*350), X+700 (i.e., X+2*350), X+1050 (i.e., X+3*350), X+N*350, where X is a memory address. The stride in this pattern is 350. Thus, after learning the pattern and upon detecting an access to, for example, memory location X (i.e., a last address), the stream prefetcher fetches the portion of memory (e.g., a cache line) at the address X+350 (i.e., the last address+the stride). Similarly, upon detecting an access to the memory X+350 (i.e., a last address), the prefetcher fetches the portion of memory (e.g., the cache line) at (X+350)+350 (i.e., the last address+the stride). In some cases, instead of prefetching the next address in the stream, a stream prefetcher can be dynamically configured using what is referred to herein as a lookahead or a lookahead value, described in more detail below. It is noted that a stream may be considered as a special case of a strided stream, where the stride is equal to 1.

The correlated prefetcher learns a pattern of addresses based on a correlation between accessed memory addresses where the correlation is not expressable as strided stream. That is, the correlation cannot be expressed as X+N*stride, where N is an integer multiplier of a detected stride value.

For example, in the series of a memory accesses A, B, C, A, B, C, A, C, F, F, F, A, A, B, and C (where A, B, C, and F are memory addresses), the sequence includes the patterns (A, B, C), (A, B), and (B, C). It is noted that the sequence includes other patterns. However, only the identified patterns are used herein for illustration purposes.

The correlated prefetcher may, depending on the strategy of the correlated prefetcher, learn that there is a 100% (i.e., 3 out of 3) chance that the sub-pattern (A, B) will be followed by an access to C; that there is a 100% (i.e., 3 out of 3) chance that the sub-pattern (B) will be followed by an access to C; that there is a 75% (i.e., 3 out of 4) chance that the sub-pattern (A) will be followed by an access to B and a 25% (i.e., 1 out of 4) that the sub-pattern (A) will be followed by (C); and so on. Thus, for example, upon detecting an access to the sub-pattern (A), the correlated prefetcher can issue one or more prefetch instructions. For example, the correlated prefetcher can prefetch B, which is the most likely next address to be accessed based on the pattern (A, B). For example, the correlated prefetcher can prefetch both B and C, based on the patterns (A, B) and (A, C). In the described example, a lookahead value of the correlated prefetcher is based on a total length of a detected pattern and a number of addresses in that pattern between an address that triggers pattern detection and a fetched address, as described in more detail below.

Figure 1:
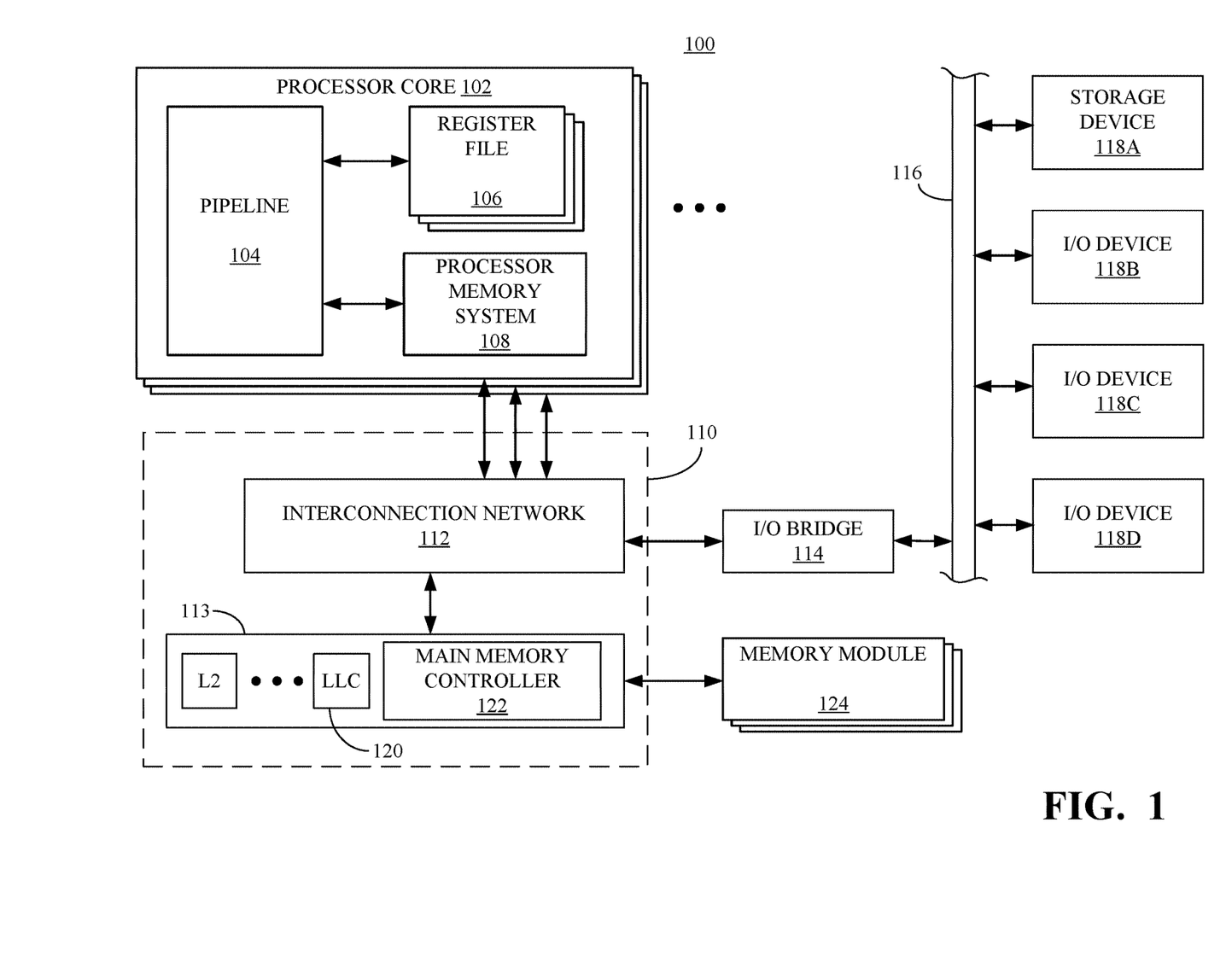
FIG. 1 is a high-level block diagram of an example of a computing system 100.
Figure 2:
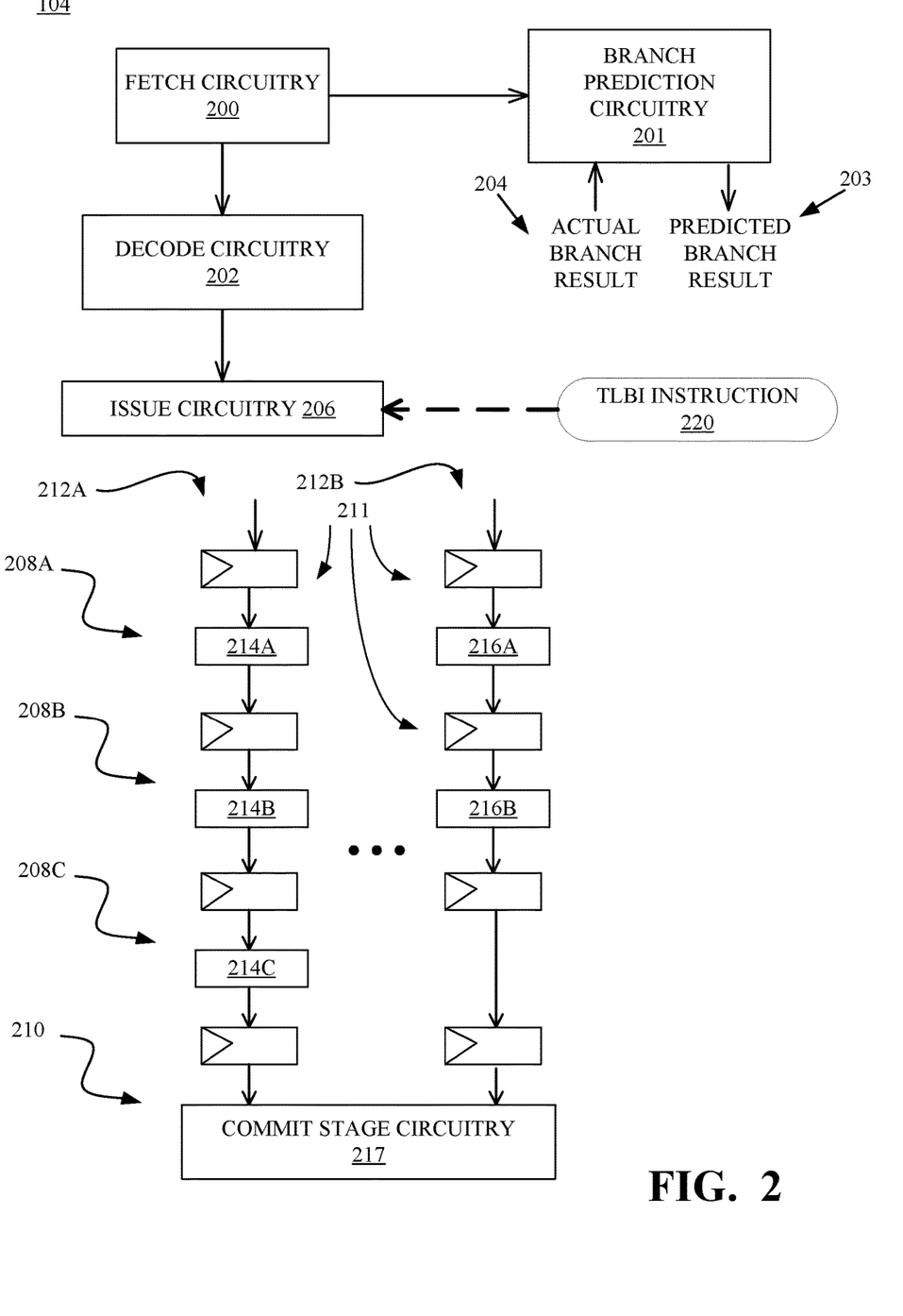
FIG. 2 is an example of a configuration of the pipeline of FIG. 1.
Figure 3:
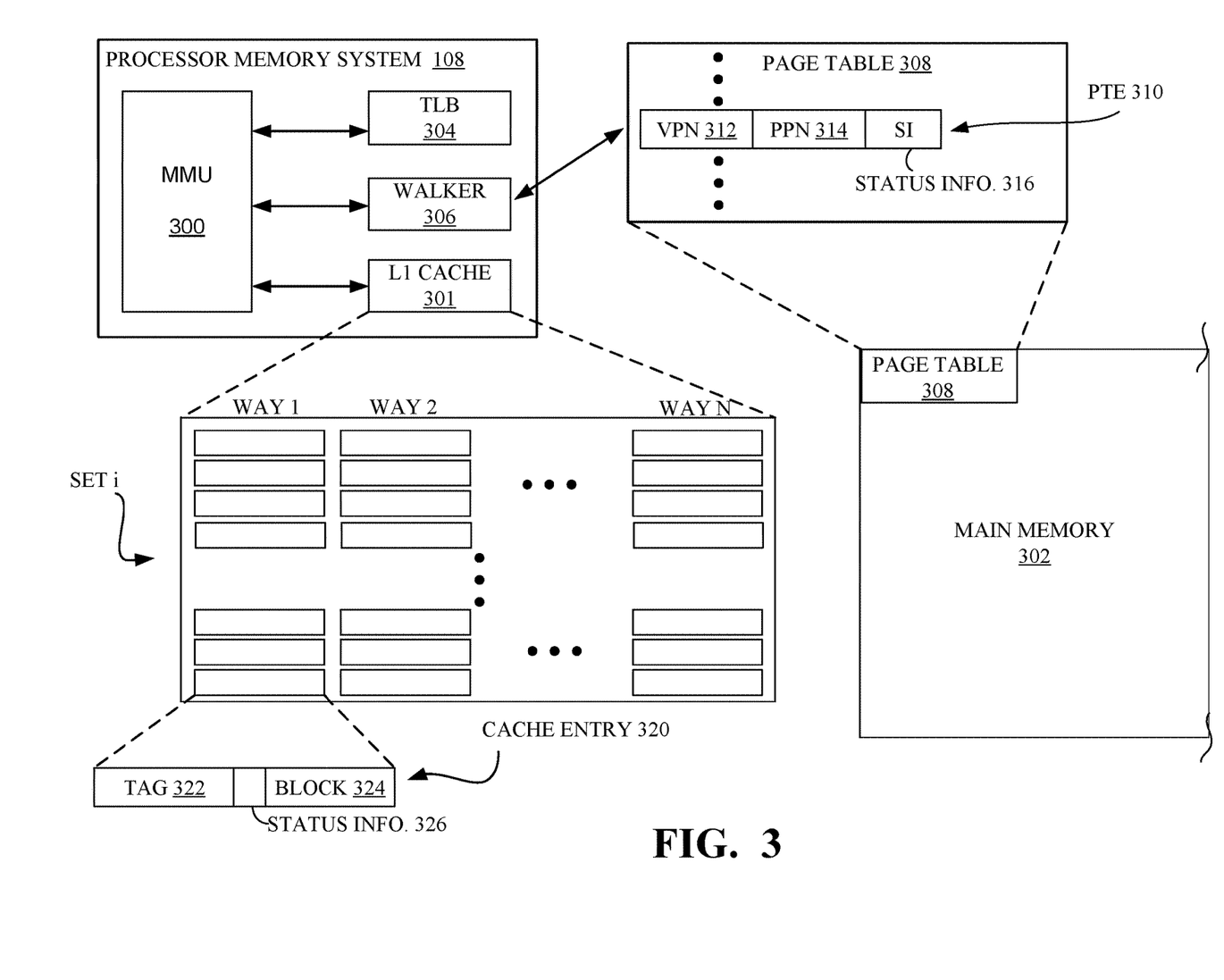
FIG. 3 is an example of a configuration of the processor memory system of FIG. 1.

Hardware data prefetchers are useful to out-of-order processor cores, such as those described with respect to FIGS.

1-3. As mentioned above, memory access latency is getting slower in terms of processor cycles as compared to processor speeds. To reduce the occurrence of processor stalls, a prefetcher for an out-of-order core can be continuously fed with memory accesses (e.g., load instructions) to ensure the accessed address will hit in the cache; otherwise, the core's pipeline will stall due to a cache miss, which results in performance degradation. The accessed address can be program instructions in an instruction cache or program data in a data cache, for example.

When a prefetcher is not correct in its prediction of what to prefetch, performance of the processor (such as a multi-core processor) can suffer. In a multicore system, bandwidth may be wasted in the case of bad prefetches and overall throughput degrades.

One of the key aspects of a prefetch operation (or simply "a prefetch") is the timing of the prefetch. If the prefetch is too early, the prefetched data may get replaced from the data cache by another prefetch or a demand-fetch. If the prefetch is too late, then the load operation that needs the prefetched data may need to stall if the prefetched data has not yet been cached. These situations are described in more detail below with respect to FIG. 4.

Adjusting the prefetch to be issued at the correct time can increase performance. Adjusting the prefetch, as used herein, can include dynamically selecting an appropriate address to fetch in response to detecting a memory access to a sub-pattern. That is, rather than setting a constant lookahead value for a prefetcher, the lookahead value can be changed depending on conditions of the computing system.

How long it takes a prefetch to return with data depends on which level of the cache hierarchy the prefetch hits on. This can also dynamically change for at least the following two reasons. First, hyperthreaded processor cores may have multiple hardware threads sharing the same L1 cache and displacing each other's data. Second, in multicore processors, the shared last level cache (LLC) can incur greater misses because multiple cores share the LLC. Thus, the data that might hit in the same last-level cache for a single core may miss in the last-level cache with multiple cores.

Accordingly, the techniques and computing systems described herein launch prefetches that are configured based on a measure of the memory access latency (e.g., a latency between a memory access request and a response to that memory access request). For example, the lookahead value can vary depending on the memory access latency. The memory access latency can refer to the number of processor cycles from a time that a memory access instruction (e.g., a load instruction) is issued until the time that data is received. The memory access latency can be measured by a core or provided by another part of the system; and the measurement can be based on a direct measurement that uses a timer (e.g., a counter), or an indirect measurement that uses an estimate or a heuristic to measure the memory access latency.

To illustrate an example, if the memory access latency increases, a hardware prefetcher can automatically increase the lookahead for a stream prefetcher. For example, if the lookahead is 2 for a stream prefetcher that learns the pattern X, X+350, X+700, X+1050, . . . then on seeing X, the prefetcher launches a prefetch for X+700. To increase the lookahead value as the memory access latency increases, the prefetcher can set the lookahead value to 3 and prefetch X+1050 when an access to address X is detected. The lookahead value can be increased successively until prefetching successfully reduces a measured memory access latency.

The techniques and systems described herein help to improve the timing of prefetches. On-time prefetches can be useful for improving the performance of a processor, which can be an out-of-order processor and/or a processor core in a multi-core architecture.

Further details of techniques for managing prefetch lookup distance based on memory access latency are described herein with initial reference to a system in which they can be implemented, as shown in FIGS. 1 through 3.

FIG. 1 is a high-level block diagram of an example of a computing system 100. The computing system 100 includes at least one processor core 102, which can be a single central processing unit (CPU) or one of multiple processor cores in a multi-core architecture. In a multi-core architecture each processor core (or simply "core") can include an individual CPU with associated circuitry. In this example of a multi-core architecture, each processor core 102 can include a pipeline 104, one or more register files 106, and a processor memory system 108. Each register file of the register files 106 can include one or more individually addressable registers.

Each processor core 102 can be connected to an uncore 110. The uncore 110 can include an interconnection network 112 and an external memory system 113. The interconnection network 112 can be a bus, a cross-bar switch, a mesh network, or some other interconnection network. The interconnection network 112 can enable communication between each processor core 102 and an external memory system 113 and/or an input/output (I/O) bridge 114.

The I/O bridge 114 can enable communication, such as over an I/O bus 116, with various different I/O devices including a storage device 118A and other I/O devices 118B-118D. Non-limiting examples of the other I/O devices 118B-118D can include a network interface, a display adapter, or user input devices such as a keyboard or a mouse.

The storage device 118A can be a disk drive or some other large capacity storage device. The storage device 118A can typically be a non-volatile storage device. In some examples, the storage device 118A, or a portion thereof, can be used in a virtual memory scheme. For example, a portion of the storage device 118A can serve as secondary storage (or a 'backing store') in a virtual memory scheme for the (typically volatile and/or capacity-limited) main memory. Examples of main memory include the processor memory system 108 or an external memory system, such as described below with respect to an external memory system 113.

The processor memory system 108 and the external memory system 113 together form a hierarchical memory system. The hierarchy can include any number of levels. The levels may be denoted or referred to as L1, L2, . . . LN. The L1 level is a lower level memory than the L2 memory system, which in turn is a lower level than the L3 memory system, and so on. Typically, each level of the hierarchical memory system can include memory (e.g., a memory system) that is slower to access than that of the immediately lower level and/or each level of the hierarchical memory system can include memory (e.g., a memory system) that is faster to access, more limited in capacity, and/or more expensive than that of a higher level. Each level of the hierarchical memory system can serve as a cache.

A first level (L1) cache can be within (e.g., a part of) the processor memory system 108. Any number of higher level (L2, L3, . . . ) caches can be within the external memory system 113. The highest (i.e., last) level cache within the external memory system 113 can be referred to as the last level cache (LLC). In an example, the LLC can be the L2 cache.

At each level, the cache can include a first module that provides an instruction cache for caching instructions and a second module that provides a data cache for caching data. The memory system of a level of the hierarchical memory system can load blocks of instructions or data into entries and evict (e.g., removes, over-writes, etc.) blocks of instructions or data from entries in units of cache blocks (also called cache lines). Cache lines are further described with respect to FIG. 3.

In addition to the L1 instruction cache and data cache, the processor memory system 108 can include a translation lookaside buffer (TLB) for caching recent translations, and various other circuitry for handling a miss in the L1 instruction or data caches or in the TLB. For example, that circuitry in the processor memory system 108 of a processor core 102 can include a write buffer for temporarily holding values to be written from a store instruction being executed within the pipeline 104. The TLB is further described with respect to FIG. 3.

As already mentioned, the highest level cache within the external memory system 113 is the LLC (such as an LLC 120). The LLC 120 can be accessed (e.g., searched, etc.) just before main memory. Of course, this is only an example. The exact division between which level caches are within the processor memory system 108 and which are in the external memory system 113 can be different in other examples. For example, the L1 cache and the L2 cache can both be internal to the processor core 102 (i.e., part of the processor memory system 108) and the L3 (and higher) caches can be external to the processor core 102.

In an example, each processor core 102 can have its own internal L1 cache, and the processor cores can share an L2 cache. The external memory system 113 can also include a main memory controller 122. The main memory controller 122 can be connected to any number of memory modules 124. Each of the memory modules 124 can serve as (e.g., can be) the main memory. In a non-limiting example, one or more of the memory modules 124 can be Dynamic Random Access Memory (DRAM) modules.

In a typical example, the content of a memory address is searched for in a level (e.g., L1) of the hierarchical memory system. If not found, then the next higher level (e.g., L2) is searched; and so on. Searching for a memory address amounts to answering the question: does this memory level of the hierarchical memory system include the content of the memory address? Or, alternatively, is the memory address cached in this memory of the hierarchical memory system?

That is, in a particular cache level of the hierarchy of the hierarchical memory system, each cache entry includes space for storing the data words of a particular memory block along with bits for determining whether a particular word from a memory block is present in that cache level (i.e., a 'hit') or not present in that cache level (i.e., a 'miss'). After a miss in one level, the cache system attempts to access (i.e., read or write) the memory block from a higher level cache, or from the main memory (in the case of a miss in the LLC).

Each level of the memory system typically has a different nominal (e.g., expected, designed, etc.) latency. For example, the nominal L1 cache latency may be 4 processor cycles; the nominal L2 cache latency may be 11 processor cycles; the nominal L3 cache latency may be 39 processor cycles; and the nominal main memory access latency may be 107 processor cycles.

The pipeline 104 can include multiple stages through which instructions advance, a cycle at a time. The stages can include an instruction fetch (IF) stage or stages, an instruction decode (ID) stage or stages, an operand fetch (OF) stage or stages, an instruction execution (IE) stage or stages, and/or a write back (WB) stage or stages. The pipeline can include other stages, as further described with respect to FIG. 2. Some stages occur in a front-end portion of the pipeline. Some other stages occur in a back-end portion of the pipeline. The front-end portion can include pre-execution stages. The back-end portion of the pipeline can include execution and post-execution stages. The pipeline 104 is further described with respect to FIG. 2.

First, an instruction is fetched (e.g., in the IF stage or stages). An instruction can be fetched based on a program counter (PC). The PC is a pointer that can be used to identify instructions within memory (e.g., within a portion of the main memory, or within an instruction cache of the core 102). The PC can advance through addresses of a block of compiled instructions (called a "basic block"). The PC can be incremented by a particular number of bytes. The particular number of bytes for incrementing the PC can depend on how long (e.g., in bytes) each instruction is and on how many instructions are fetched at a time.

After being fetched, the instruction is then decoded (e.g., in the ID stage or stages) to determine an operation and one or more operands. Alternatively, in some pipelines, the IF and ID stages can overlap. If the instruction includes operands, the operands are fetched (e.g., in the OF stage or stages).

The instruction is then ready to be issued. Issuing an instruction starts progression of the instruction through stages in a back-end portion of the pipeline to execute the instruction. In an example, execution of the instruction can involve applying the operation of the instruction to the operand(s) to produce a result for an arithmetic logic unit (ALU) instruction. In an example, execution of the instruction can involve storing or loading to or from a memory address for a memory instruction. In an example, execution of the instruction can involve evaluating a condition of a conditional branch instruction to determine whether or not the branch should be taken.

After an instruction has completed execution, the instruction can be committed (i.e., retired) so that any effect of the instruction is made globally visible to software. Committing an instruction may involve storing a result in a register file (e.g., in the WB stage or stages), for example. In most implementations, even if any instructions were issued out-of-order, all instructions are generally committed in-order.

FIG. 2 is an example of a configuration of the pipeline 104 of FIG. 1.

The pipeline 104 can include circuitry for the various stages (e.g., the IF, ID, and OF stages). For one or more instruction fetch stages, an instruction fetch circuitry 200 provides a PC to an instruction cache in a processor memory system, such as the processor memory system 108 of FIG. 1, to fetch (e.g., retrieve, read, etc.) instructions to be fed (e.g., provided to, etc.) into the pipeline 104. For example, the PC can be a virtual address of the next instruction, in which case the PC can be incremented by the length of a virtual address in the case of sequential execution (i.e., without taking any branches). Virtual addresses are described with respect to FIG. 3.

The instruction fetch circuitry 200 can also provide the program counter, PC, to a branch prediction circuitry 201. The branch prediction circuitry 201 can be used to provide a predicted branch result 203 for branch instructions. The predicted branch result 203 enables the pipeline 104 to continue executing speculatively while an actual branch result 204 is being determined. The branch prediction circuitry 201 can also store branch history information that is updated based on receiving the actual branch result 204. In some implementations, some or all of the branch prediction circuitry 201 can be considered to be a part of the instruction fetch circuitry 200.

In an example of the out-of-order execution, for one or more instruction decode (ID) stages, instruction decode circuitry 202 can store information in an issue queue for instructions in an instruction window waiting to be issued. The issue queue (which can also be referred to as an instruction queue) is such that an instruction in the queue can leave the queue when the operands of the instruction become available. As such, the instruction can leave before earlier (e.g., older) instructions in a program being executed. The instruction window refers to a set of instructions that can execute out-of-order.

An issue circuitry 206 can determine a respective cycle in which each of the instructions in the issue queue are to be issued. Issuing an instruction makes the instruction available to progress through circuitry of instruction execution (IE) stages, such as a first execution stage 208A, a second execution stage 208B, and a third execution stage 208C, of the pipeline 104. For simplicity of explanation, only three execution stages are illustrated in FIG. 2. However, the disclosure herein is not so limited: more or fewer execution stages are possible.

The pipeline 104 can include one more commit stages, such as a commit stage 210. A commit stage commits (e.g., writes to memory) results of instructions that have made their way through the IE states 208A, 208B, and 208C. For example, a commit stage circuitry 217 may write back a result into a register file, such as the register file 106 of FIG. 1. However, some instructions may not be committed by the commit stage circuitry 217. Instead, the results of the instructions may be committed by other circuitry, such as circuitry in another stage of the back-end or a stage of the front-end, possibly based on information from the commit stage.

Between adjacent stages of the pipeline 104, the various paths through the pipeline circuitry include pipeline registers. For example, shown in FIG. 2 are pipeline registers 211 for the IE stages 208A, 208B, and 208C. The pipeline registers can be used for storing results of an upstream stage to be passed downstream to a next stage. The pipeline registers 211 may be clocked by (i.e., receive a clock signal derived from) a common clock (not shown). Thus, each clock cycle, each pipeline register 211 (also called a latch, or a set of flip-flops) can pass a result from its input to its output and becomes ready to receive a new result in its input after that result has been produced by the circuitry of that stage.

There may be multiple separate paths through the IE stages. The IE stages can include various circuitry for executing different types of instructions. For illustration purposes, only two paths 212A and 212B are shown in FIG. 2. However, the execution stages can include any number of paths with corresponding circuitry, which can be separated by pipeline registers, such as the pipeline registers 211.

The number of paths through the instruction execution stages can generally be dependent on the specific architecture. In an example, enough paths can be included such that a number of instructions up to a maximum number of instructions that can progress through the same execution stages in the same cycles. The maximum number of instructions that can progress through the same execution stages in the same cycles can be referred to as the issue width.

The number of stages that include functional circuitry for a given path may also differ. In the example of FIG. 2, a first path 212A includes functional circuitry 214A, 214B, and 214C located in the first execution stage 208A, the second execution stage 208B, and the third execution stage 208C, respectively. The second path 212B includes functional circuitry 216A and 216B located in the first execution stage 208A and the second execution stage 208B, respectively. In the second path 212B, the third execution stage 208C is a "silo stage" that passes a result along without performing further computation thereby ensuring that each path passes through the same number of stages through the pipeline.

In an example, a path can include circuitry for executing instructions using units for various operations (e.g., ALU, multiplier, floating point unit, etc.). In an example, another path can include circuitry for executing memory access instructions. The memory access instructions can include load instructions that read data values from the memory system. The memory access instructions can include store instructions to write data values to the memory system. The circuitry for executing memory access instructions can also initiate translation of virtual addresses to physical addresses, when necessary, as described in more detail below with respect to FIG. 3.

In addition to branch prediction, as described with respect to the branch prediction circuitry 201, the pipeline 104 can be configured to perform other types of speculative execution. In an example of another type of speculative execution, the pipeline 104 can be configured to reduce the chance of stalling (such as in the event of a cache miss) by prefetching. Stalling refers to the situation in which processor execution of instructions is stopped/paused.

A prefetch request can be used to preload a cache level (e.g., of a data cache) so that a future memory request is likely to hit in that cache level instead of having to access a higher cache level or a main memory. For example, a speculative memory access request can include prefetch requests that are sent to preload an instruction cache or data cache based on a predicted access pattern.

A prefetch request can be or can include a software prefetch request such that an explicit prefetch instruction that is inserted into the pipeline 104 includes a particular address to be prefetched. A prefetch request can be or can include a hardware prefetch that is performed by hardware within the processor (e.g., the processor core 102) without an explicit prefetch instruction being inserted into its pipeline (e.g., the pipeline 104).

In some cases, prefetching can include recognizing a pattern (e.g., a stream) within the memory accesses of a program, or can include speculatively performing a load instruction within a program (e.g., using a speculative address for that load instruction) before that load instruction is actually issued as part of program execution.

Various types of external instructions can be received from other processor cores. Such externally received instructions can be inserted into the pipeline 104 by the issue circuitry 206 to be handled at the appropriate stage. An example of such an externally received instruction is a TLB invalidation (TLBI) instruction 220 for invalidating entries in the TLB of that particular processor core (i.e., the receiving core). Another example of an external instruction that can be received is a GlobalSync instruction, which may be broadcast to processor cores as a side effect of a memory barrier operation performed by a processor core to ensure that the effects of any previously broadcast TLBIs have been completed.

FIG. 3 is an example of a configuration of the processor memory system 108 of FIG. 1. In example illustrated in FIG. 3, the processor memory system 108 includes a memory management unit (MMU) 300 that manages access to the memory system. The MMU 300 can manage the translation of virtual addresses to physical addresses.

In some implementations, the MMU 300 can determine whether a copy of a stored value (e.g., data or an instruction) at a given virtual address is present in any of the levels of the hierarchical cache system, such as in any of the levels from an L1 cache 301 up to the LLC 120 (FIG. 1) if necessary. If so, then the instruction accessing that virtual address can be executed using a cached copy of the value associated with that address. If not, then that instruction can be handled by miss circuitry to be executed after accessing the value from a main memory 302.

The main memory 302, and potentially one or more levels of the cache system, may need to be accessed using a physical address (PA) translated from the virtual address (VA). To this end, the processor memory system 108 can include a TLB 304 that stores translations, defined by VA-to-PA mappings, and a page table walker 306 for accessing a page table 308 if a translation is not found in the TLB 304. The translations stored in the TLB can include recently accessed translations, likely to be accessed translations, some other types of translations, or a combination thereof.

The page table 308 can store entries, including a page table entry (PTE) 310, that contain all of the VA-to-PA mappings currently in use. The page table 308 can typically be stored in the main memory 302 along with physical memory pages that represent corresponding mapped virtual memory pages that have been "paged in" from secondary storage (e.g., the storage device 118A of FIG. 1).

A memory page can include a number of cache blocks. A cache block can include a number of words. A word is of a predetermined number (e.g., 2) of bytes. A byte is a group of bits (e.g., 8 bits), which can be operated on as a unit. A byte can be considered a unit of memory size.

Alternatively, in a virtualized system with one or more guest operating systems managed by a hypervisor, virtual addresses (Vas) may be translated to intermediate physical addresses (IPAs), which are then translated to physical addresses (Pas). In a virtualized system, the translation by a guest operating system of Vas to IPAs may be handled entirely in software, or the guest operating system may have some hardware assistance from the MMU 300.

The TLB 304 can be used for caching recently accessed PTEs from the page table 308. The caching of recently accessed PTEs can enable the translation to be performed (such as in response to a load or a store instruction) without the page table walker 306 having to perform a potentially multi-level page table walk of a multiple-level data structure storing the page table 308 to retrieve the PTE 310. In an example, the PTE 310 of the page table 308 can store a virtual page number 312 and a physical page number 314, which together serve as a mapping between a VA and a PA that defines a translation of that VA.

An address (i.e., a memory address) can be a collection of bits. The bits of the memory address can be divided into low-order bits and high-order bits. For example, assuming 32-bit addresses, an example of a memory address is 01101001 00101000 00001101 01011100. The low-order bits are the rightmost 16 bits (i.e., 00001101 01011100); and the high-order bit are the leftmost 16 bits (i.e., 01101001 00101000). The low-order bits of a memory address can be used as a page offset. The low-order bits can be identical for a VA and its mapped PA. Thus, the high-order bits of a memory address can be used as a memory page number to specify the mapping.

The PTE 310 can also include status information (SI) 316. The SI 316 can indicate whether or not the page is resident in the main memory 302 or whether the page should be retrieved from secondary storage. When the PTE 310 is stored in an entry of any of the TLB 304, there may also be additional information for managing the transfer of PTEs between the page table 308 and the TLB 304, and for invalidating PTEs in the TLB 304. In an example, invalidating PTEs in the TLB 304 can be accomplished by toggling a bit (that indicates whether the entry is valid or not) to a state (i.e., a binary state) that indicates that the entry is invalid. However, other ways of invalidating PTEs are possible.

If a valid entry in the TLB 304 that matches with a portion of a VA to be translated is found (i.e., a "TLB hit"), then the PTE stored in that entry is used for translation. If there is no match (i.e., a "TLB miss"), then the page table walker 306 can traverse (or "walk") the levels of the page table 308 retrieve a PTE.

The L1 cache 301 can be implemented in any number of possible ways. In the implementation illustrated in FIG. 3, the L1 cache 301 is illustrated as being implemented as an N-way set associative cache module. Each cache entry 320 of the L1 cache 301 can include bits for storing a particular cache block 324 that has been copied from a physical page in the main memory 302 (possibly via higher level cache module).

The cache entry 320 can also include bits for storing a tag 322. The tag 322 can be made up of a number of the most significant bits of a virtual address, which are common to the words of that entry. For a virtually indexed, virtually tagged (VIVT) type of cache module, in addition to comparing a tag portion of a virtual address of desired data, the cache module can compare an index portion of the virtual address (which can be made up of middle bits between the tag and a block offset) to determine which of multiple sets may have a cache entry containing those desired data.

Figure 4:
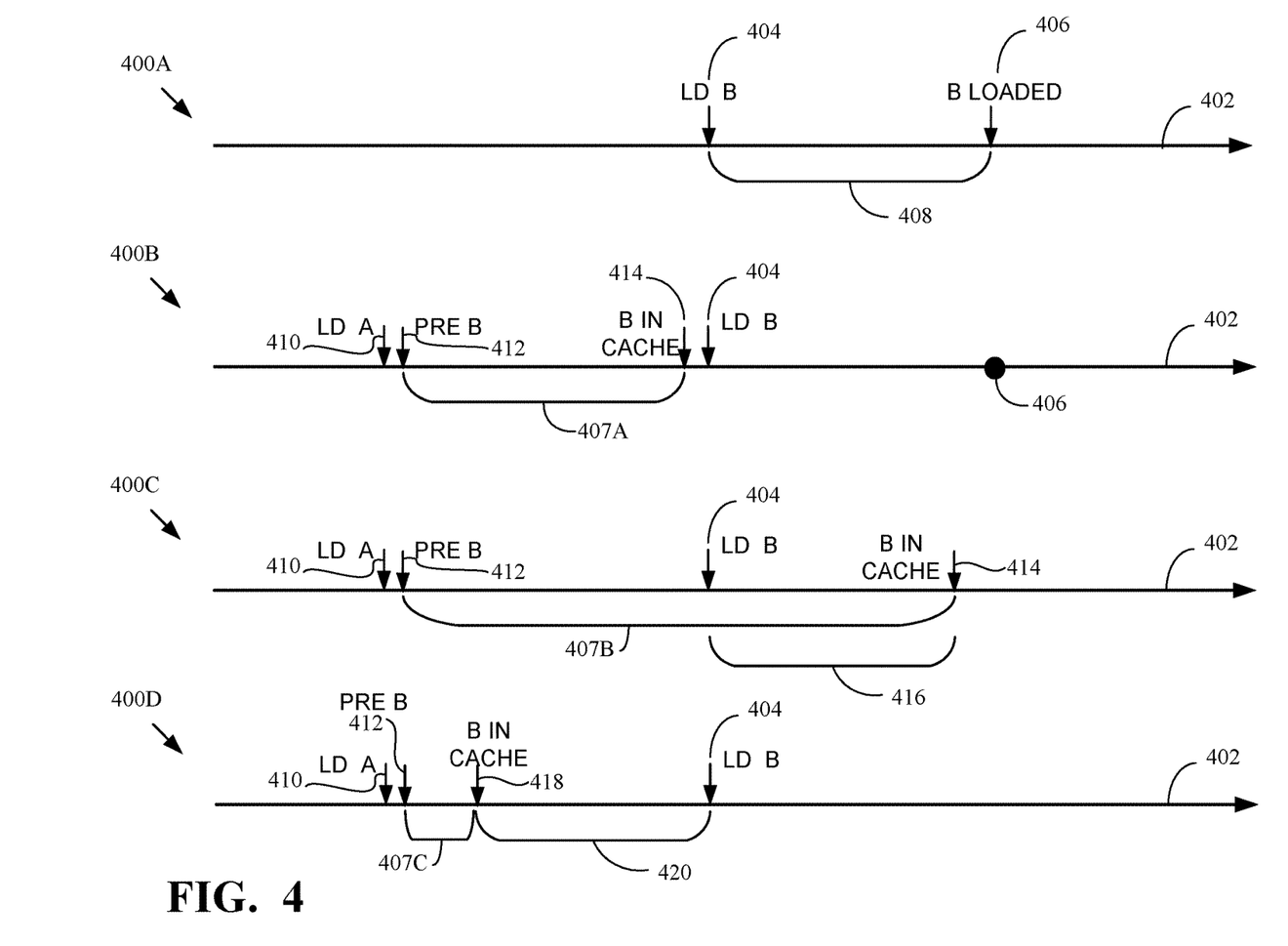
FIG. 4 illustrates examples of prefetch instructions.

FIG. 4 illustrates different examples 400A-400D of loading addresses. The example 400A shows a case in which no prefetching has been performed, and in particular, an address B is accessed without being part of a learned pattern, as described in more detail below. The examples 400B-400D show cases for which a correlated prefetcher has learned a pattern (e.g., the pattern A, B). That is, the prefetcher has learned that an access of the address A is typically followed by an access to the address B (e.g., after the pattern has been observed a minimum number of times, according to a predetermined threshold). Thus, upon detecting a load instruction 410 of the address A from a memory level (e.g., a cache level), the prefetcher issues a prefetch 412 of the contents of address B. These examples will illustrate different latency intervals for loading the contents of the address B into the memory level (e.g., the cache level).

The memory level in these examples is a shared memory level. For example, the shared memory level can be shared by multiple processor cores 102. The shared memory level can be an LLC, such as the LLC 120 of FIG. 1. The memory level can be shared by multiple threads that are running (e.g., executing) within the same processer core. Thus, as the memory level is a shared memory level, the access latency of the memory level is non-deterministic. That is, the access latency from the memory level is not expected to be a constant. The access latency from the memory level may change because the multiple cores or the multiple threads may be (e.g., simultaneously) issuing requests to the shared memory level.

As mentioned above, in the example 400A, no prefetches are issued. Thus, the example 400A is an example of demand-fetch. A timeline 402 illustrates times when selected events occur for different examples, including when prefetches (labeled PRE) are performed relative to the operations of memory access instructions and other events. The timeline 402 shows certain events relevant to the respective example being described, but not all events that occur during operation of the pipeline. A load instruction is issued at 404 to load the contents of the memory address B, which is not already available in the memory level. Thus, the contents of the memory at address B (or a cache block including the address B) are fetched from a higher level of the memory system. A latency interval 408 illustrates how long it takes for the content to be loaded at 406 from a higher level memory system. In this example 400A, the latency interval 408 is relatively long to illustrate a situation in which the load instruction misses in the cache levels and needs to access the main memory.

As mentioned above with respect to FIG. 1, the latency interval 408 can vary depending on the memory level of the various memory systems (i.e., the processor memory system 108, the external memory system 113, or one of the memory modules 124) in which the contents of the address B are currently available. Thus, the processor may stall until the contents of the memory address B are loaded at 406. That the processor is stalled, in this context, can mean at least that the processor cannot make further progress with respect to the load instruction and/or instructions that depend on a value of the load instruction.

The example 400B illustrates a situation in which the correlated prefetcher has learned the pattern (A, B). Thus, after detecting a load instruction of the address A at 410, a prefetch of the contents of address B is performed at 412. After a latency interval 407A, the contents of the address B are loaded at 414 into at least one memory level outside of the main memory (the "preloaded memory level"). For example, the prefetcher can be configured to load a value into the L1 cache level. Alternatively, a prefetcher may be configured to load a value in the another cache level, including the LLC 120. Thus, the contents of the address B are available from the preloaded memory level within a relatively short access time when the load instruction is executed at 404 (assuming the contents of the preloaded memory level are not evicted by another memory access in the meantime). Thus, as compared to the example 400A, the processor does not need to wait until time 406 to retrieve the contents of the address B from main memory.

As mentioned above, the latency of instructions that access the main memory or various memory levels is non-deterministic (i.e., can vary) in some systems. The examples 400C-400D illustrate the impact of the varying latency on the availability of the contents of the address B in the preloaded memory level when the load instruction for the address B issues at 404.

In the example 400C, the latency interval 407B corresponds to the time between prefetching B at 412, after the correlated address A is loaded at 410, and loading of the preloaded memory level at 414. Thus, the address B is not available in the preloaded memory level until the time 414, which is after the load instruction for the contents of address B issues at 404. As such, the processor stalls for a duration 416 for the prefetch of B to complete. In the example 400D, the latency interval 407C corresponds to the time between prefetching B at 412, after the correlated address A is loaded at 410, and loading of the preloaded memory level at 418. Thus, the address B is available in the preloaded memory level at time 418, which may be far in advance of the load instruction for the contents of address B issued at 404. The address B is available in the preloaded memory level for a duration 420 ahead of the load instruction at 404.

Prefetching the address B into the preloaded memory level can, in some situations, have adverse effects. For example, loading the address B can cause the eviction of some other memory data that the processor may use before the address B. For example, other required data by the processor may cause the address B to be evicted before the load instruction 404, which causes the address B to be reloaded as described with respect to the example 400A. So, simply prefetching a larger number of addresses within a recognized pattern of addresses, may not be the best way to improve performance. Instead, some techniques for mitigating memory access latency use dynamically controlled lookahead to improve the timing and usefulness of the addresses that are prefetched.

To generalize, and as further described with respect to FIG. 7 below, if the prefetcher learned the pattern (A, B, C) (or the two patterns (A, B) and (B, C)), then in the example 400C (i.e., as the latency increases), the prefetcher may, instead of prefetching the address B, fetch a later predicted address than B. Thus, upon detecting a load instruction for the address A (i.e., the load instruction 404), the prefetcher may fetch the address C. That is, the prefetcher fetches an address that is two lookahead values (e.g., addresses) ahead in the detected pattern. Later, upon determining that the latency has improved, the prefetcher reverts to prefetching the address B, as in the example 400B. Thus, the prefetcher first increases and then decreases the lookahead value. In these examples, the lookahead value is increased by one and then reduced by one in the pattern (A, B, C).

Figure 5:
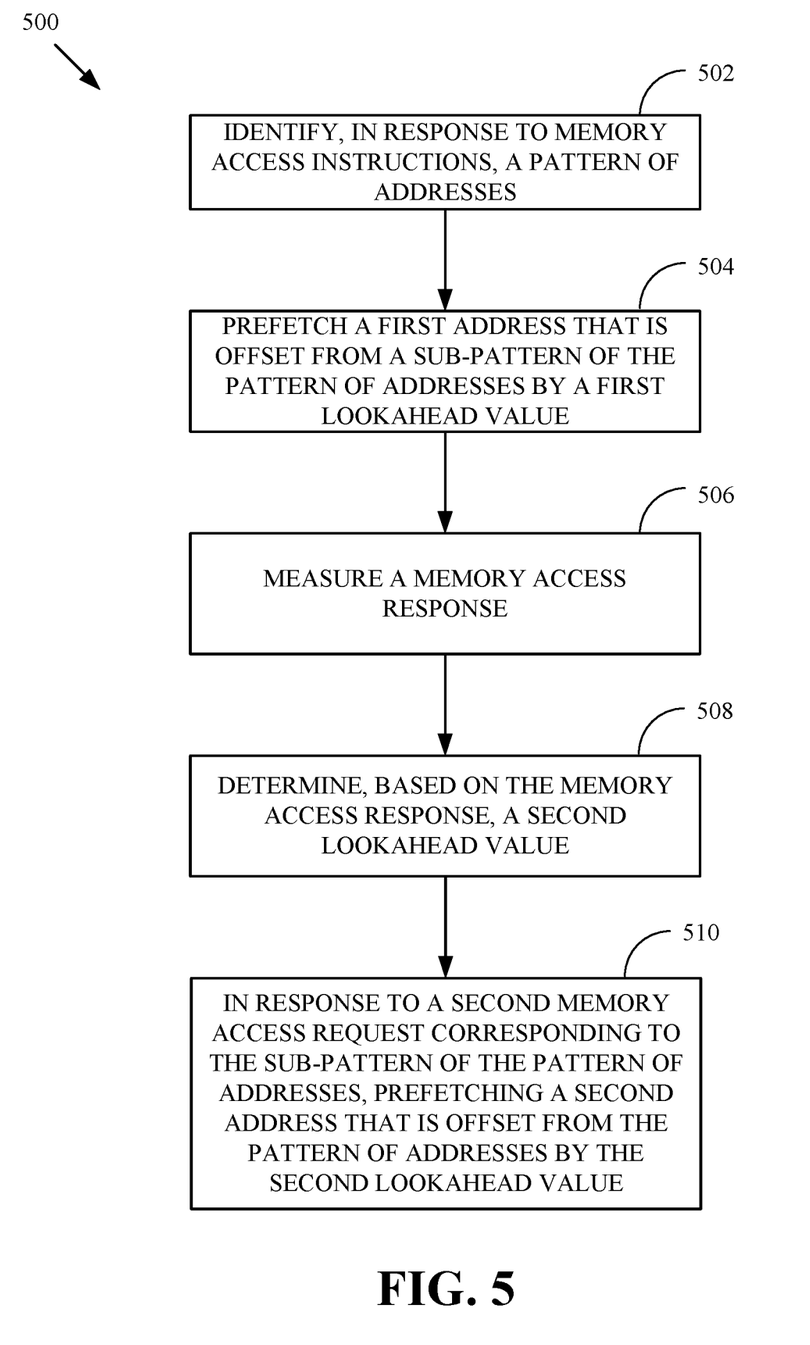
FIG. 5 is an example of a flowchart of a technique for memory prefetching in a processor.

FIG. 5 is an example of a flowchart of a technique 500 for memory prefetching in a processor. The technique 500 can be implemented by a prefetcher. The technique 500 can be used to monitor memory accesses and prefetch from other memory addresses based on the memory accesses. The technique 500 learns that a pattern of addresses (e.g., a stream of addresses or correlated pattern of addresses) is typically accessed in a particular sequence. When accesses to a sub-pattern of the pattern of addresses is detected (e.g., identified, recognized, etc.), the technique 500 prefetches at least one address that is a lookahead value away from the sub-pattern. The lookahead value can change over time depending on the memory access latency for accessing a monitored memory level. In an example, the processor is a multi-threaded processor, the monitored memory level is main memory, and the preloaded memory level is a cache level, where the cache level can be any cache level up to and including a last level cache that is shared by the multiple threads.

At 502, the technique 500 identifies, in response to memory access instructions, a pattern of addresses. As used in this disclosure, "identify" means to learn, form, produce, select, construct, determine, specify, generate, or other identify in any manner whatsoever.

The monitored memory level is, in some examples, one that has a non-deterministic latency. A memory level that has a non-deterministic latency can be one that is shared, such as amongst processor cores or threads of a core. The monitored memory level can be a last level cache. The monitored memory level can be the main memory. A memory level is non-deterministic when a first access to the memory level requires a first number of processor cycles and a second access to the memory level requires a second number of processor cycles that is different from the first number of processor cycles.

Figure 6:
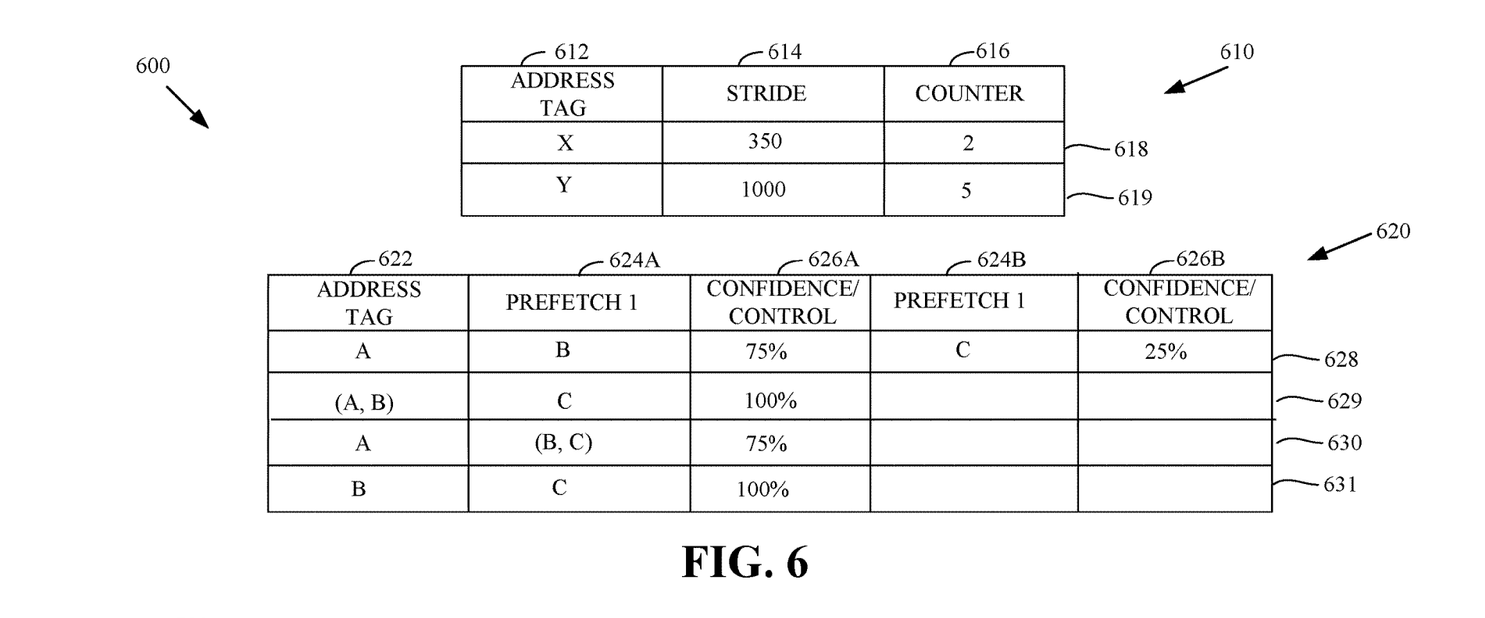
FIG. 6 is an example of prefetcher data structures.

FIG. 6 is an example 600 of prefetcher data structures. The example 600 includes a data structure 610 and a data structure 620. The data structures 610-620 are simplified views of structures that may be maintained by prefetchers. The data structure 610 can be maintained by a strided (e.g., a stream) prefetcher. The data structure 620 can be maintained by a correlated prefetcher. The data structures 610 and 620 can include more, fewer, or other columns than those described below.

The data structure 610 can include a column 612 that is indicative of an address tag of entry of the stream, a column 614 that is indicative of the stride of the stream, and a column 616 that is indicative of the number of times that the stream has been detected. In an example, the column 616 can be a saturating counter. In some examples, the stream prefetcher does not prefetch a next address of the stream until the counter of the stream has reached a certain value. That is, the technique 500 does not identify the pattern of addresses until the counter has reached a predefined value.

The data structure 610 includes entries for each stream that is detected. An entry (or a set of entries) 618 are associated with the stream X described above (i.e., X, X+350, X+700, X+1050, . . . ); an entry (or a set of entries) 619 are associated with another stream, Y. The stream X is identified as having a stride of 350 and the stream X has been accessed 2 times. The stream Y is identified as having a stride of 1000 (i.e., a lookahead value) and the stream Y has been accessed 5 times.

The data structure 620 can include a column 622 indicating a memory address (i.e., a sub-pattern) of a pattern of addresses. The memory address can include one or more memory addresses. For example (and using the pattern of addresses described above: A, B, C, A, B, C, A, C, F, F, F, A, A, B, and C), with respect to the pattern (A, B, C), the column 622 can include the sub-pattern (A), as shown in a row 628 and a row 630; the column 622 can include the sub-pattern (A, B) as shown in a row 629. A column 624A indicates an address to prefetch. The address to prefetch can include one address. For example, the row 628 indicates that, upon detecting an access of the sub-pattern A, the memory address B (as shown in the column 624A) is to be prefetched. A row 631 indicates that upon detecting an access of the sub-pattern (B), the address C is to be prefetched. The address to prefetch can include more than one address. For example, the row 630 indicates that, upon detecting an access of the sub-pattern (A), the memory addresses B and C (as shown in the column 624A) are to be prefetched.

As mentioned above, the correlated prefetcher can maintain transition probabilities, such as shown in columns 626A and 626B. Thus, the correlated prefetcher can include more than one probabilistic prefetch address, such as shown in the column 624A and a column 624B. However, in other implementations, the prefetcher may not maintain transition probabilities.

While not specifically shown in the data structure 620, the correlated prefetcher can also include, for each of the prefetch addresses a corresponding counter, such as described with respect to the column 616 of the data structure 610.

At 504, in response to a first memory access request corresponding to a sub-pattern of the pattern of addresses, the technique 500 prefetches a first address that is offset from the sub-pattern of addresses by a first lookahead value. The first address is part of the pattern. To illustrate, FIG. 6 is now referenced. However, it is noted that the first lookahead value can be determined as described below with respect to 508 of the technique 500 and FIG. 7.

With respect to the stream prefetcher described with respect to the data structure 610 of FIG. 6, which includes a stride, the first lookahead value can be a first multiple of the stride. Thus, if the stride is 350, as shown in the column 614 of FIG. 1, and assuming that the multiplier is 1, then in response to accessing the sub-pattern X+700, the technique 500 prefetches (X+700)+(1*350)=(X+1050).

With respect to a correlated prefetcher, the first lookahead value corresponds to an offset to an address of the correlated pattern (A, B, C). For example, the first lookahead value indicates the number of addresses away from the detected sub-pattern (A). Thus, if the lookahead value is 1, then in response to accessing the sub-pattern (A), the address B is to be prefetched. If the lookahead value is 2 (i.e., 2 hops from the sub-pattern), then in response to accessing the sub-pattern (A), the address C is to be prefetched. The technique 500 can use the data in a data structure such as the data structure 620, or any other data structure, to identify the appropriate address of a given pattern that is to be prefetched.

At 506, the technique 500 measures a memory access latency. The memory access latency measures the response time of a memory access request, such as a load instruction, from the monitored memory level, such as the main memory, until the content at the requested address is received in the pipeline. That is, when a memory address request (e.g., a demand-fetch request or a prefetch request) is made, the memory access latency measures the time that it took for the memory system to return the request. The time can be measured in processor cycles. However, other measures are possible, such as picoseconds or nanoseconds.

The technique 500 can record the memory access latency for at least a subset of the memory accesses (or requests to the monitored memory level). The technique 500 can record the memory access latency of all memory accesses, some or all of the demand-fetch requests, some or all of the prefetch requests, or a combination thereof. Memory access latencies can be maintained in a data structure, as described with respect to FIG. 7.

Figure 7:
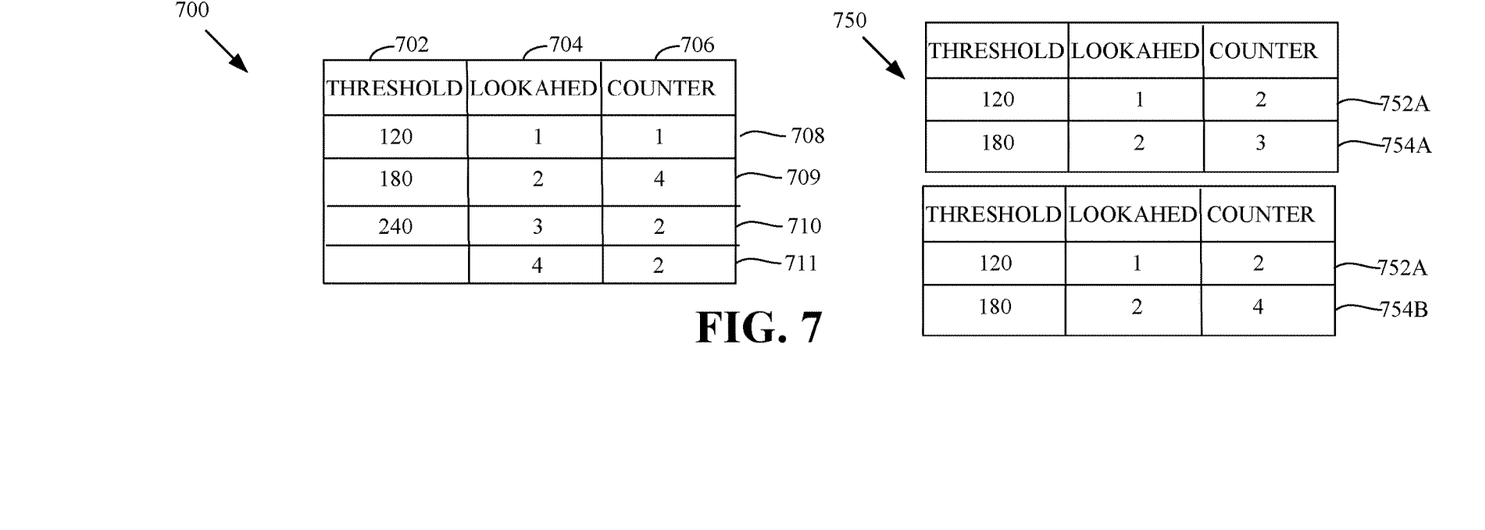
FIG. 7 is an example of a data structure for maintaining memory access latencies.

FIG. 7 is an example of a data structure 700 for maintaining memory access latencies. The data structure 700 includes a threshold 702, a lookahead 704, and a counter 706. However, in other implementations, the data structure 700 can include fewer, more, or other data. For example, the data structure 700 may not include the lookahead 704. Rather, the values of the lookahead 704 may be separately maintained (e.g., stored, hard-coded, calculated, etc.) by the technique 500 or added to the prefetcher data structures for the identified patterns, such as the data structures 610-620. The values used in these examples are for clarity of illustration, and do not necessarily correspond to typical values that would be used in a typical processor.

In each row of the data structure 700, the threshold 702 indicates an upper limit of a range. The threshold values of the ranges can be related to the nominal (e.g., expected) latency of requests to access the monitored memory level. The nominal latency is the expected latency of requests to access the monitored memory level under no-contention conditions. A nominal latency of 60 cycles is used to describe the data structure 700. The thresholds can, but need not, be related to the nominal latency. In the data structure 700, each threshold is an integer multiple of the nominal latency. More generally, each threshold can be a function of the nominal latency of the monitored memory level.

If a memory access falls within the range that has the threshold as an upper limit, then the corresponding counter is increased. With respect to the first threshold (i.e., 120), a row 708 can be read as: if the memory access is less than 120 cycles, then increase the counter of the row 708 by 1. With respect to the second threshold (i.e., 180), a row 709 can be read as: if the memory access is greater than 120 cycles and less than 180 cycles, then increase the counter of the row 709 by 1. With respect to the third threshold (i.e., 240), a row 710 can be read as: if the memory access is greater than 180 cycles and less than 240 cycles, then increase the counter of the row 710 by 1. A row 711 can be read as: if the memory access is greater than 240 cycles, then increase the counter of the row 711 by 1.

Referring again to FIG. 5, at 508, the technique 500 determines, based on the memory access latency, a second lookahead value that is different from the first lookahead value. The technique 500 can use the counter column 706 of FIG. 7 to determine the lookahead value when prefetching. For example, the counter values can be used to select a particular lookahead value from a row with a maximum counter value, or the counter values can be used to weight the lookahead values from the rows to compute a lookahead value closest to a weighted average. A default lookahead value can be selected when all of the counters start at zero. A new lookahead value can be computed at predetermined intervals, or in response to dynamic metrics based on changing conditions. Other lookahead value selection techniques can be used.

In one example of a lookahead value selection technique, when the counter 706 for a threshold (e.g., a row of the data structure 700) reaches a predetermined value, the corresponding lookahead value (i.e., the lookahead 704) is used in the prefetching. For example, assuming that the predetermined value is 4, then, since the counter 706 of the row 709 has reached the predetermined value (i.e., 4), then the technique 500 uses the lookahead value of 2 for subsequent fetch instructions. After the lookahead value of the technique 500 changes to a new value, all counters in the data structure 700 can be reset to 0.

Thus, at 510, in response to a second memory access request corresponding to the sub-pattern of the pattern of addresses, the technique 500 prefetches a second address. The second address is such that it is part of the pattern and is offset from the sub-pattern of addresses by the second lookahead value.

Data structure 750 is a running example that illustrates the operation of the technique 500. Assume that a pattern (A, B, C) is learnt by the technique 500 (i.e., the prefetcher), that the nominal latency is 60, and that the predetermined value for the counter is 2. Initially, the lookahead value is 1. The counters of the data structures 750 are initially set to zero. In response to detecting an access to the memory address A (i.e., sub-pattern (A)), the technique 500 prefetches the address B.

After a series of memory accesses, the technique 500 determines the memory access latencies based on clock cycles and increments the counters accordingly. Thus, the counter in a row 752A of a data structure 750 has increased to 2, and the counter in a row 754A of the data structure 750 has increased to 3. As no counter has yet reached the predetermined value of 4, a next access to the memory address A results in the technique 500 prefetching the memory address B, which is still offset by a lookahead value of 1 (i.e., one address away from the sub-pattern (A)). After a next memory access, the technique 500 determines that the memory access latency is 165. Thus, the counter of the row 754A is increased by 1, as shown in a row 754B.

The counter in the row 754B has now reached the predetermined value (i.e., 4). Thus, a lookahead value of 2 is thereafter used and the counters are reset to zero (not shown). When a technique 500 detects an access to the sub-pattern (A), the technique 500 issues a prefetch for an address that is offset by a lookahead value of 2 in the detected pattern. Thus, the technique 500 issues a prefetch for the memory address C.

The above illustrates managing prefetch lookahead distance for correlated prefetching. In a similar example of managing prefetch lookahead distance for stream prefetching, an initial stride may be 1. Thus, in the stream pattern X, X+350, X+700, . . . , in response to detecting an access to memory location X, the technique prefetches the memory location X+350. If, for example, the counter for the threshold value 240 is the first counter to reach the predetermined value, then when the technique 500 detects an access to memory location X, the technique 500 prefetches the address X+1050 (i.e., the address at 3 times the stride value of the stream); and when the technique 500 detects an access to address X+350, the technique 500 prefetches the memory address X+1400.

In an example, determining, based on the memory access latency, the second lookahead value can include, in response to determining that the memory access latency exceeds the function of the nominal latency, setting the second lookahead value to be further away from the sub-pattern of the pattern of addresses than the first lookahead value.

In an example, determining, based on the memory access latency, the second lookahead value can include, in response to determining that the memory access latency does not exceed the function of the nominal latency, setting the second lookahead value to be closer to the sub-pattern of the pattern of addresses than the first lookahead value.

It is noted that while positive stride values are discussed above, negative stride values are also possible. It is also noted that while positive lookahead values are discussed above, negative lookahead values are also possible.

For simplicity of explanation, the technique 500 is depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the technique 500 (and the algorithms, methods, instructions, etc., stored thereon and/or executed thereby, including by technique 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for memory prefetching in a processor, comprising:
   identifying, in response to memory access instructions, a pattern of addresses, wherein the pattern of addresses comprises a sub-pattern of addresses, a first address not included in the sub-pattern of addresses, and a second address not included in the sub-pattern of addresses;
   in response to a first memory access request matching the sub-pattern of addresses included in the pattern of addresses, prefetching the first address, wherein the first address is offset from the sub-pattern of addresses by a first lookahead value;
   measuring a memory access latency;
   determining, based on the memory access latency, a second lookahead value, wherein the second lookahead value is different from the first lookahead value; and
   in response to a second memory access request matching the sub-pattern of addresses included in the pattern of addresses, prefetching the second address, wherein the second address is offset from the sub-pattern of addresses by the second lookahead value.

2. The method of claim 1, wherein the memory access latency corresponds to a number of processor cycles.

3. The method of claim 1, further comprising:
   setting the second lookahead value based on a comparison of the memory access latency to a function of a nominal latency of a memory level accessed by the memory access instructions.

4. The method of claim 3, wherein the comparison compares the memory access latency to a multiple of the nominal latency of the memory level.

5. The method of claim 3, wherein determining, based on the memory access latency, the second lookahead value comprises:
   in response to determining that the memory access latency exceeds the function of the nominal latency, setting the second lookahead value to be further away from the sub-pattern of addresses than the first lookahead value.

6. The method of claim 3, wherein determining, based on the memory access latency, the second lookahead value comprises:
   in response to determining that the memory access latency does not exceed the function of the nominal latency, setting the second lookahead value to be closer to the sub-pattern of addresses than the first lookahead value.

7. The method of claim 1,
   wherein the pattern of addresses is a stream pattern comprising a stride,
   wherein the first lookahead value is a first multiple of the stride, and
   wherein the second lookahead value is a second multiple of the stride that is different from the first multiple of the stride.

8. The method of claim 1,
   wherein the pattern of addresses comprises a correlated pattern of addresses,
   wherein the first lookahead value corresponds to an offset, relative to the sub-pattern of addresses, of the first address of the correlated pattern of addresses, and
   wherein the second lookahead value corresponds to an offset, relative to the sub-pattern of addresses, of the second address of the correlated pattern of addresses that is different from the first address of the correlated pattern of addresses.

9. A processor comprising:
   a first memory level;
   a second memory level; and
   a prefetcher,
      wherein the prefetcher is configured to monitor memory accesses in the first memory level,
      wherein the prefetcher is further configured to prefetch from the first memory level to the second memory level, and
      wherein the prefetcher is further configured to:
         identify, in response to memory access instructions, a pattern of addresses, wherein the pattern of addresses comprises a sub-pattern of addresses, a first address not included in the sub-pattern of addresses, and a second address not included in the sub-pattern of addresses;
         in response to a first memory access request matching the sub-pattern of addresses, prefetching, from the first memory level to the second memory level, the first address, wherein the first address is offset from the sub-pattern of addresses by a first lookahead value;
         measure a memory access latency of the first memory level;
         determine, based on the memory access latency, a second lookahead value, wherein the second lookahead value is different from the first lookahead value; and
         in response to a second memory access request matching the sub-pattern of addresses, prefetch the second address, wherein the second address is offset from the sub-pattern of addresses by the second lookahead value.

10. The processor of claim 9, wherein the first memory level comprises a main memory, and the second memory level comprises a cache level of a hierarchical memory system.

11. The processor of claim 9, wherein the first memory level comprises a non-deterministic memory level such that a first access to the first memory level has a latency of a first number of processor cycles, and a second access to the first memory level has a latency of a second number of processor cycles, wherein the first number of processor cycles is different from the second number of processor cycles.

12. The processor of claim 9, wherein the prefetcher is further configured to set the second lookahead value based on a comparison of the memory access latency to a function of a nominal latency of a memory level accessed by the memory access instructions.

13. The processor of claim 12, wherein the comparison compares the memory access latency to a multiple of the nominal latency of the memory level.

14. The processor of claim 12, wherein determining, based on the memory access latency, the second lookahead value comprises:
in response to determining that the memory access latency exceeds the function of the nominal latency, setting the second lookahead value to be further away from the sub-pattern of addresses than the first lookahead value.

15. The processor of claim 12, wherein determining, based on the memory access latency, the second lookahead value comprises:
in response to determining that the memory access latency does not exceed the function of the nominal latency, setting the second lookahead value to be closer to the sub-pattern of addresses than the first lookahead value.

16. The processor of claim 9,
wherein the pattern of addresses is a stream pattern comprising a stride,
wherein the first lookahead value is a first multiple of the stride, and
wherein the second lookahead value is a second multiple of the stride that is different from the first multiple of the stride.

17. The processor of claim 9,
wherein the pattern of addresses comprises a correlated pattern of addresses,
wherein the first lookahead value corresponds to an offset, relative to the sub-pattern of addresses, of the first address of the correlated pattern of addresses, and
wherein the second lookahead value corresponds to an offset, relative to the sub-pattern of addresses, of the second address of the correlated pattern of addresses that is different from the first address of the correlated pattern of addresses.

18. An apparatus comprising:
memory;
a cache; and
a prefetcher,
wherein the prefetcher is configured to monitor memory accesses in the memory,
wherein the prefetcher is further configured to prefetch from the memory to the cache, and
wherein the prefetcher is further configured to:
identify, in response to memory access instructions, a pattern of addresses, the pattern of addresses comprising a sub-pattern of addresses, a first address not included in the sub-pattern of addresses, and a second address not included in the sub-pattern of addresses;
in response to a first memory access request matching the sub-pattern of addresses, prefetching, from the memory to the cache, the first address, wherein the first address is offset from the sub-pattern of addresses by a first lookahead value;
measure a memory access latency of the memory;
determine, based on the memory access latency, a second lookahead value, wherein the second lookahead value is different from the first lookahead value; and
in response to a second memory access request matching the sub-pattern of addresses, prefetch the second address, wherein the second address is offset from the sub-pattern of addresses by the second lookahead value.

19. The apparatus of claim 18, wherein the prefetcher is further configured to set the second lookahead value based on a comparison of the memory access latency to a function of a nominal latency of a memory level accessed by the memory access instructions.

20. The apparatus of claim 19, wherein determining, based on the memory access latency, the second lookahead value comprises:
in response to determining that the memory access latency exceeds the function of the nominal latency, setting the second lookahead value to be further away from the sub-pattern of addresses than the first lookahead value.

21. The method of claim 1, wherein prefetching the second address occurs after the first address has already been prefetched.

\* \* \* \* \*